(12) United States Patent
Uhlmann et al.

(10) Patent No.: US 11,757,319 B2
(45) Date of Patent: Sep. 12, 2023

(54) STAR DISK FOR A ROTOR OF AN EXTERNALLY EXCITED SYNCHRONOUS MACHINE

(71) Applicant: AUDI AG, Ingolstadt (DE)

(72) Inventors: Philipp Uhlmann, Ingolstadt (DE); Patrick Herrmann, Pfaffenhofen a.d. Ilm (DE); Martin GERNGROß, Kinding (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/321,086

(22) Filed: May 14, 2021

(65) Prior Publication Data

US 2021/0359561 A1   Nov. 18, 2021

(30) Foreign Application Priority Data

May 15, 2020   (DE) .......................... 102020113209.3

(51) Int. Cl.
*H02K 3/28* (2006.01)
*H02K 3/51* (2006.01)
*H02K 1/28* (2006.01)
*H02K 15/09* (2006.01)

(52) U.S. Cl.
CPC ................. *H02K 1/28* (2013.01); *H02K 3/28* (2013.01); *H02K 3/51* (2013.01); *H02K 15/09* (2013.01)

(58) Field of Classification Search
CPC .. H02K 3/00; H02K 3/28; H02K 3/32; H02K 3/325; H02K 3/51; H02K 3/52; H02K 3/522; H02K 3/527; H02K 15/00; H02K 15/09; H02K 15/10; H02K 15/12
See application file for complete search history.

(56) References Cited

U.S. PATENT DOCUMENTS

2008/0042512 A1   2/2008  Otsuji

FOREIGN PATENT DOCUMENTS

| DE | 10 2010 064 051 |   | 6/2012  |           |
|----|-----------------|---|---------|-----------|
| DE | 102013001916    | * | 8/2013  | H02K 3/52 |
| DE | 10 2019 205 101 |   | 10/2020 |           |
| FR | 2969856         | * | 6/2012  | H02K 3/52 |
| JP | 2004140964      | * | 5/2004  | H02K 3/52 |

* cited by examiner

*Primary Examiner* — Tran N Nguyen
(74) *Attorney, Agent, or Firm* — SEED INTELLECTUAL PROPERTY LAW GROUP LLP

(57) ABSTRACT

A star disk for a rotor of an externally excited synchronous machine, having a central disk body, from which multiple webs extend radially, at the ends of which an end plate is provided each time, so that between the disk body and the respective end plate there is formed a winding groove, being bounded by the web forming the groove bottom and laterally by the disk body and the end plate, forming groove flanks, and serving to contain a conductor winding led around the web and formed from a conductor wire which is wound in multiple layers, wherein the web is provided with flutes running in the winding direction and serving to contain a respective conductor wire segment, there being provided at least one additional flute on a groove flank at least on one side of the web.

13 Claims, 4 Drawing Sheets

STAR DISK FOR A ROTOR OF AN EXTERNALLY EXCITED SYNCHRONOUS MACHINE

BACKGROUND

Technical Field

Embodiments of the invention relate to a star disk for a rotor of an externally excited synchronous machine, having a central disk body, from which multiple webs extend radially, at the ends of which an end plate is provided each time, so that between the disk body and the respective end plate there is formed a winding groove, being bounded by the web forming the groove bottom and laterally by the disk body and the end plate, forming groove flanks, and serving to contain a conductor winding led around the web and formed from a conductor wire which is wound in multiple layers, wherein the web is provided with flutes running in the winding direction and serving to contain a respective conductor wire segment.

Description of the Related Art

An electric machine basically consists of a fixed piece, the stator, and a movable piece, the rotor. The rotor itself usually consists of a rotor shaft, on which a laminated core is placed, consisting of a multitude of separate metal plates. In an externally excited synchronous machine, furthermore, the rotor comprises a number of conductor windings, corresponding to the number of individual phases, such a synchronous machine usually being a three-phase machine. The conductor windings run axially and are led around the rotor ends, so that corresponding winding structures result. In order to lead the conductor wire around the two rotor ends, the laminated core is closed off at the respective ends by a so-called star disk, on which corresponding winding grooves are formed, in which the respective conductor wire is wound in multiple layers, one on top of another, so that it runs from one star disk to the other, being led through the laminated core.

For this, each star disk has a central disk body, by which it is mounted on the rotor shaft. From this body there extend radially outward a number of webs, corresponding to the number of poles of the rotor, each web being closed off by an end plate. The central disk body and the end plates respectively form groove flanks, bounding the respective winding groove radially inward and outward, while the web or the web side facing away from the laminated core forms the groove bottom.

In order to achieve an exact laying of the conductor wire with a secure positioning of the conductor wire in the first layer wound on the web, it is known how to provide the web with flutes running in the winding direction, each flute serving to contain an inserted conductor wire segment. Accordingly, this fluting makes it possible to more or less secure each conductor wire segment so that it does not slip to the side and a defined first layer is produced, making possible the winding of further layers. However, if multiple layers are wound on top of one another, a precise positioning across all layers is not always possible, due to the fluctuating wire diameter and any manufacturing tolerances of the star disk.

BRIEF SUMMARY

The present disclosure provides a star disk which is improved as compared to the aforementioned related art.

The solution of this problem for a star disk of the kind mentioned above is that there is provided at least one additional flute on a groove flank at least on one side of the web.

A star disk as described herein may be provided with a fluting not only on the web, i.e., on the groove bottom, but also on at least one of the two groove flanks, having at least one additional flute on this groove flank, such as multiple additional flutes staggered in height. In addition to the laying or supporting of the conductor wire or the conductor wire segments on the groove bottom, this also makes possible an additional supporting in one or more further wire layers, lying on top of the first wire layer, depending on the number of additional flutes. In this way, an additional sideways guidance is assured in at least one, such as multiple further wire layers, since a defined winding geometry with a defined conductor laying can also be achieved at the side, so that a better layered structure and thus a larger copper fill factor can be achieved, where an increased copper fill factor in turn leads to a higher efficiency of the machine.

At least one additional flute may be provided not only on one side of the web, i.e., on one groove flank, but also on both groove flanks, i.e., both sides of the web, there being provided at least one, such as multiple additional flutes with staggered height on each groove flank, so that a guidance not only in one additional wire layer, but also in multiple additional wire layers is possible.

The additional flute on one or both groove flanks may be provided at the height of the next layer of the conductor winding, that is, there is a direct height-level connection to the first winding plane on the web or in the fluting of the web. If only one additional flute is provided, it would also be conceivable to provide this in a higher plane. Regardless of this, the heightwise spacing between this additional flute and the web plane or the web fluting is of course chosen in dependence on the wire diameter, so that it is assured that the respective additional flute is positioned precisely the wire layer resulting from the winding.

Multiple additional flutes may be provided staggered in height on the groove flank or on each groove flank, being thus arranged in different height layers, with the height layers corresponding of course to corresponding wire layers or wire planes. The additional flutes need not directly adjoin the web plane or the web fluting, but instead may also be staggered heightwise relative to each other, and neither does a direct succession need to be present in the flute sequence of the additional flutes, but instead here as well there can be a corresponding offset by multiple wire layers.

In some embodiments, however, the multiple flutes are provided at progressive heights of the conductor winding, so that each winding layer or plane following the first wire layer is also laid precisely sideways on one or on both sides.

The multiple flutes are provided along at least one quarter of the height of the respective groove flank, but in some embodiments also more, if the height of the overall winding structure so requires. The flutes may extend across the same height on both groove flanks, so that there is an equal, symmetrical wire laying on both sides.

As described, the conductor wire is wound in the winding groove. In order to cover the winding groove with windings across its entire width, it is necessary to lay the wire radially from the inside to the outside and back, in order to wind the individual layers with parallel running conductor segments. A layer offset is necessarily required in each wrap around by which the conductor wire is further displaced radially outward or inward by one wire thickness or one wire diameter. Such a layer offset is usually realized by winding about the one star disk, while on the other star disk there is a simple wrap around without offset. In order to define the layer offset already in the first layer, yet at the same time realize an exact conductor laying likewise on the other star disk, one especially advantageous modification calls for at least the flutes on the web to run either perpendicular to the longitudinal axis of the web or at an angle to it, not being 90°, the angle being dimensioned such that the exit of a flute is staggered relative to the entrance by one wire thickness of the conductor wire. That is, the two star disks are designed different, as regards the fluting on the web. The one star disk where no layer offset is present has a fluting in which the flutes run perpendicular to the web longitudinal axis. Of course, all flutes run parallel, regardless of the configuration, but not at an angle in this case, being instead orthogonal to the longitudinal axis of the web. This makes possible a guided winding process, yet without producing any layer offset. The other star disk, however, is configured in its fluting specifically for a defined layer offset. The flutes of the fluting, also running parallel to each other here, stand at an angle not equaling 90° to the longitudinal axis of the web. The angle is dimensioned such that the flute entrance and the flute exit, looking radially, are staggered from each other by one wire thickness or one wire diameter. That is, the wire of one wrap around is laid offset from the wire of the previous wrap around by precisely one wire thickness or one wire diameter.

The web may have a rectangular cross section with rounded edges at least on the winding groove side, and the flutes may run across the outside of the web and at least a portion of the two web sides. Thanks to this rectangular web configuration and the fluting on the web outside, extending also at least partly on the two web sides across which the wire is laid, an extensive laying of the conductor in the fluting is achieved. Furthermore, especially when a layer offset is realized on the star disk via the fluting, a very exact conductor laying and thus a very stable layer construction is achieved, so that the layer offset is produced along a relatively long winding distance, starting from the flute entrance at one web side along the flute length on the web outside and up to the flute exit on the other web side.

One embodiment includes the forming of a groove on the disk body, which guides the conductor into the winding groove, extending as far as the web and emerging in a plane with the web-side flutes. The first wire coming from the star disk must necessarily be introduced into the winding groove. This wire may be furnished along a groove formed on the disk body, extending as far as the web and into the region of the fluting. The groove emerges in a plane with the first web-side flute, so that the conductor is furnished and taken onward in this sunken flute plane. This means that the furnished conductor is furnished sunken by a wire thickness already at the start. Now, this means that the conductor can be wound at the very beginning in the second winding plane with no problems, and no "bulge" is formed in the winding, which would be the case if the wire were to protrude from the plane of the fluting at the start. This is likewise very advantageous for an exact layered structure.

The star disk itself may be made from plastic, that is, it is an injection molded part, on which the corresponding geometry and in particular the fluting can be fashioned by an appropriate injection mold.

The present disclosure moreover relates to a rotor, comprising a rotor axis as well as a laminated core arranged thereon, and two star disks of the above described kind, closing the laminated core at the ends, on which conductor windings are wound. In some embodiments, the one star disk has a layer offset defined or formed through the fluting, while the fluting of the other star disk defines a simple wrap around without offset. That is, the one star disk with the layer offset has flutes running at an angle not equaling 90° to the longitudinal axis, while the other star disk has flutes running perpendicular to the longitudinal axis of the web.

Finally, the present disclosure moreover relates to a synchronous machine, comprising a rotor of the above described kind.

BRIEF DESCRIPTION OF THE SEVERAL VIEWS OF THE DRAWINGS

Further benefits and details will emerge from the following described embodiments as well as the drawings.

DETAILED DESCRIPTION

Figure 1:
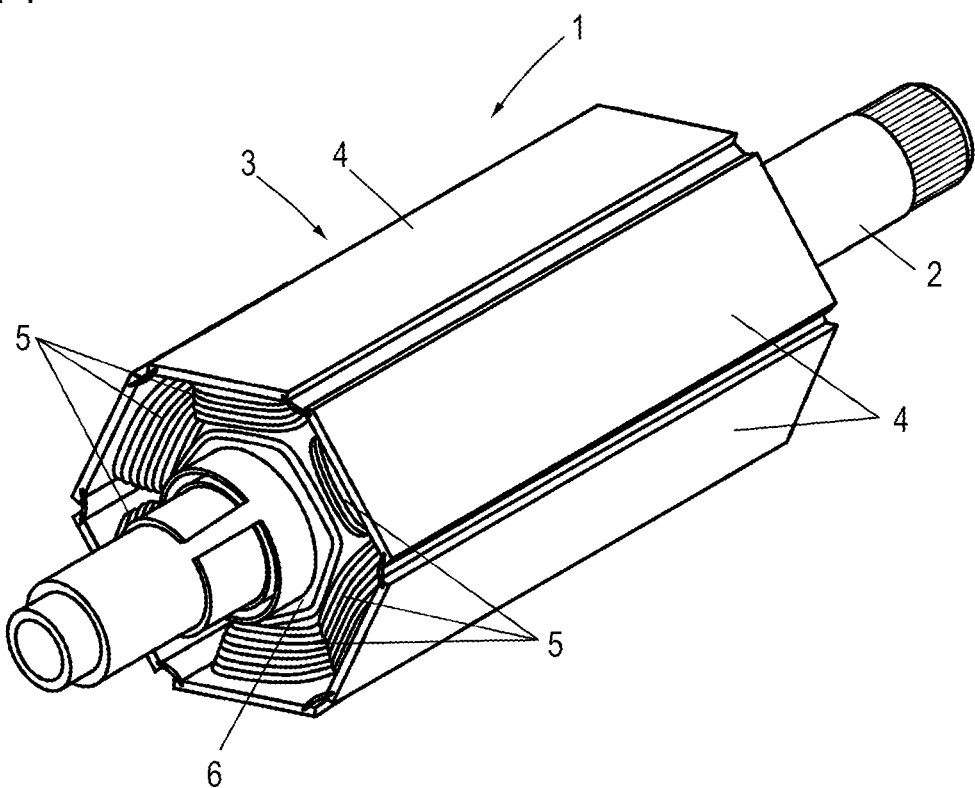
FIG. 1 illustrates a perspective view of a rotor.

FIG. 1 shows a rotor 1, comprising a rotor axis 2, on which is arranged a laminated core 3 consisting of a plurality of metal plates arranged in axial succession. On the laminated core 3 there are formed a series of individual poles 4, associated with respective conductor windings 5, which can be excited by an exciter current to generate a magnetic field across the poles 4.

In order to form these windings, the laminated core 3 is closed axially at both ends by a respective star disk 6, the conductor windings 5 being wound across the star disks 6 and wrapped there in corresponding winding grooves. The star disks 6 may be made of plastic and are designed to make possible the most exact layered structure thanks to the multiple conductor layers wound on top of one another.

Figure 2:
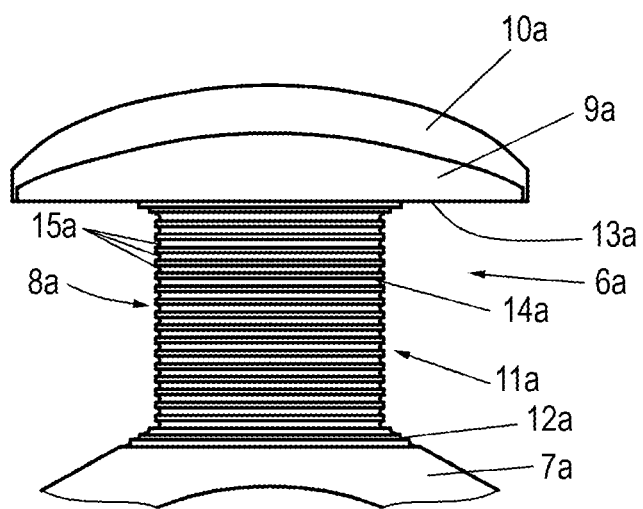
FIG. 2 illustrates a partial view of a star disk of a first embodiment, representing a web plus a winding groove.

FIG. 2 shows a partial view of a first star disk 6*a*. This consists of a central disk body 7*a*, also see FIGS. 3 and 4, having a central bore, through which the rotor shaft 2 runs. Standing radially outward from the central disk body 7*a* are multiple webs 8*a*, six of them in the example shown, which in turn are provided with end plates 9*a*, on which are arranged flux-conducting metal elements 10*a*. The configuration is such that a winding groove 11*a* is formed, being bounded or defined by a radially inward groove flank 12*a*, formed by the disk body 7*a*, and a radially outward groove flank 13*a*, formed by the end plate 9*a*, and also radially by the web 8*a* which defines the groove bottom 14*a*.

Figure 3:
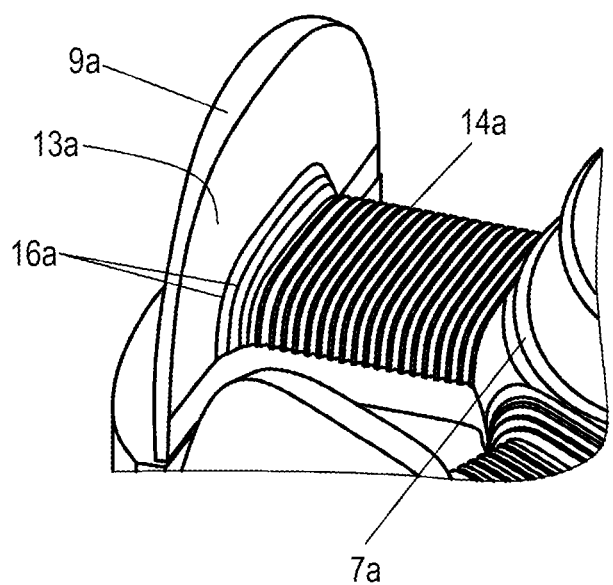
FIG. 3 illustrates a perspective view of part of the star disk of FIG. 2, representing the fluting on the radially outer groove flank.
Figure 4:
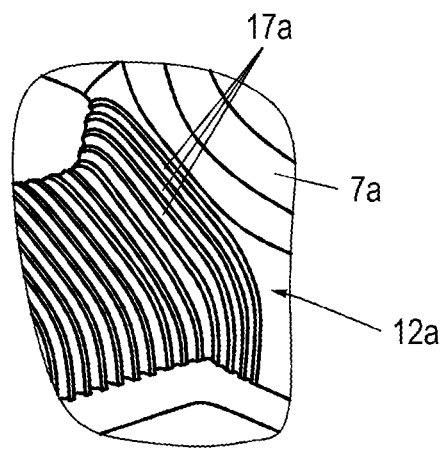
FIG. 4 illustrates a perspective view of part of the star disk of FIG. 2, representing the fluting on the radially inner groove flank.

As shown by FIGS. 2-4, a multitude of flutes 15*a* are provided on the web 8*a* itself, all of them running parallel to each other. The web 8*a* itself has an almost rectangular cross section with rounded outer edges, and the flutes 15*a* extend from the one narrow web side across the web outside to the other narrow web side, as shown in particular by FIGS. 3 and 4.

However, the flutes 15a do not extend only across the web 8a itself Instead, see FIGS. 3 and 4, multiple additional flutes 16a are formed on the radially outer groove flank 13a, i.e., the end plate 9a, and multiple additional flutes 17a are formed on the inner groove flank 12a, i.e., on the disk body 7a. The additional flutes 16a and 17a on each groove flank 12a and 13a are situated at the same height, i.e., in the same winding planes, while the individual additional flutes 16a and 17a adjoin each other heightwise each time, i.e., being spaced apart from each other heightwise by a defined spacing, corresponding to roughly the wire thickness. In terms of geometry, they also run curved, similar to the flutes 14a. That is, the entire fluting is raised up by the additional flutes 16a, 17a on the groove flanks 12a, 13a, so that besides an exact guidance and supporting of the wrapped conductor wire segments in the groove bottom 14a, i.e., in the flutes 15a, there is also produced a supporting, radially considered, by the additional flutes 16a, 17a on the groove flanks 12a, 13a, so that the conductor wire is not only led and supported cleanly in the first winding layer directly on the web 8a, but also in multiple further layers wound on top of it. Even though only a few flutes 16a are provided for example on the outer groove flank 13a, it is of course conceivable to also raise these up further, i.e., to provide even more flutes 16a.

That is, a very exact conductor guidance and conductor support is achieved in this way, which is advantageous for a very exact layered structure.

As is evident, the flutes 15a run orthogonally to the longitudinal axis of the web 8a. Consequently, no layer offset is produced across this web 8a, that is, the conductor wire exits in the same plane from the particular flute 15a which it has entered.

Figure 5:
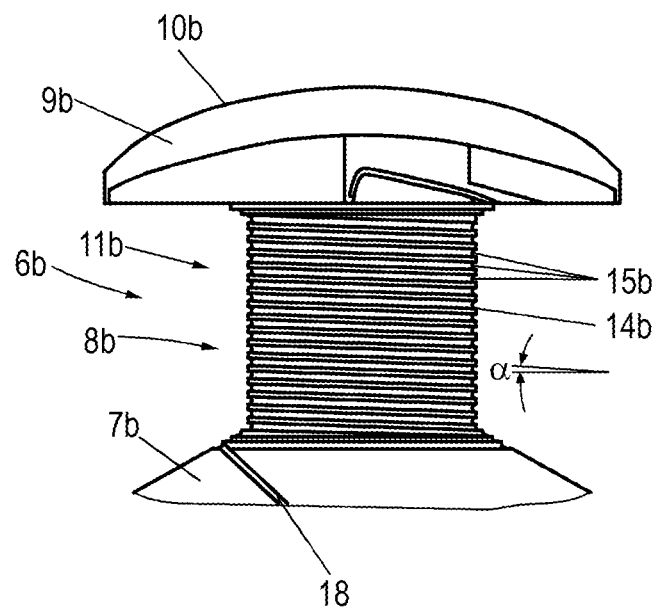
FIG. 5 illustrates a partial view of a star disk of a second embodiment, with slanted flutes.
Figure 6:
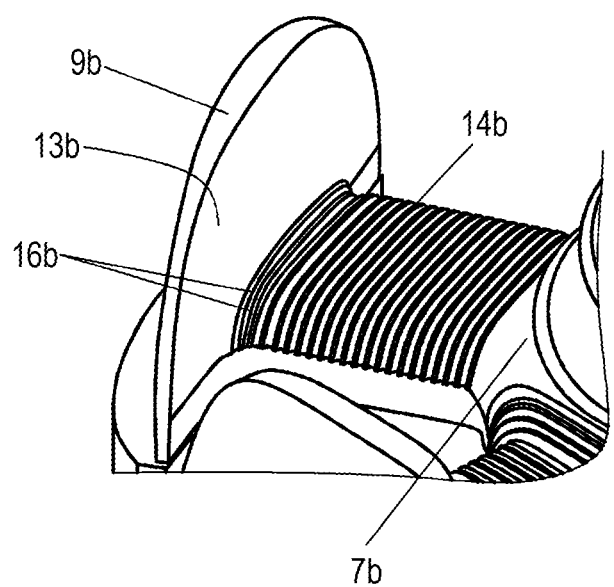
FIG. 6 illustrates a perspective view of part of the star disk of FIG. 5, representing the fluting on the radially outer groove flank.
Figure 7:
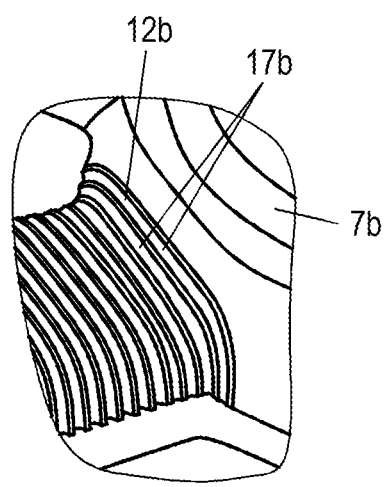
FIG. 7 illustrates a perspective view of part of the star disk of FIG. 5, representing the fluting on the radially inner groove flank.

But since the wire during the winding of the conductor winding 5 is led radial outward and inward in corresponding alternating frequency, it is necessary to lead it further on, in a defined wrap around position, radially outward or inward by more or less one wire thickness. This is accomplished by an appropriate flute guidance on the web itself, as shown by FIGS. 5-7.

These show a second embodiment of a star disk 6b, having a disk body 7b and a web 8b, which in turn has an end plate 9b with a flux-conducting metal element 10b. Thus, here as well a winding groove 11b is formed, once more defined by a radially inward groove flank 12b on the disk body 7b and a radially outward groove flank 13b on the end plate 9b.

Once again, a fluting 14b is provided on the web 8b itself, formed by multiple parallel running flutes 15b, but these run (see FIG. 5) at an angle α to the web longitudinal axis. That is, the respective flute entrance and flute exit are offset from each other, radially viewed, and this by exactly one wire thickness or one wire diameter, so that the wire exit lies one wire thickness further radially outward than the wire entrance. In this way, a defined layer offset is realized in the first layer, and here as well the flutes 15b (see FIGS. 6 and 7) likewise extend not only across the web outside, but also across the narrow web sides.

Here as well (see FIGS. 6 and 7), corresponding additional flutes 16b, 17b are provided on the groove flanks 12b, 13b, similar to the configuration of FIGS. 2-4. That is, here as well an exact wire guidance is produced also on the two groove flanks 12b, 13b in higher winding layers. Once again, the additional flutes 16b, 17b adjoin each other here as well from the height of the first flute plane, while here as well even more additional flutes 16b, 17b can be provided, which therefore can extend even higher above the groove flanks.

FIG. 5 finally shows a groove 18, formed on the disk body 7b, by which the conductor wire is introduced for the first time in the winding groove 11b. This groove 18 leads to the groove bottom, i.e., to the fluting 14b, and emerges in a groove 15b, so that the furnished conductor wire is sunken as it were, and enters in the fluting plane. This means that it can be wound with no problem on top of the next second winding layer and following layers, without forming a "bulge" in the winding, which would be detrimental to the layered structure.

German patent application no. 10 2020 113209.3, filed May 15, 2020, to which this application claims priority, is hereby incorporated herein by reference in its entirety.

Aspects and features of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A star disk for a rotor of an externally-excited synchronous machine, comprising:
   a central disk body, from which multiple webs extend radially;
   a respective end plate provided at an end of each web;
   a respective winding groove between the disk body and each end plate;
   each winding groove being bounded by the respective web forming a groove bottom and laterally by the disk body and the respective end plate, forming groove flanks;
   each winding groove serving to contain a respective conductor winding led around the web and formed from a conductor wire which is wound in multiple layers, wherein the web is provided with flutes running in the winding direction and serving to contain a respective conductor wire segment; and
   wherein at least one additional flute is provided on one of the groove flanks and the at least one additional flute is provided at a height of a next layer of the conductor winding.

2. The star disk according to claim 1, wherein the at least one additional flutes includes a first additional flute provided on a first one of the groove flanks and a second additional flute provided on a second one of the groove flanks.

3. The star disk according to claim 1, wherein the at least one additional flute includes multiple additional flutes provided at different heights of the conductor winding on one or both of the groove flanks.

4. The star disk according to claim 3, wherein the multiple additional flutes are provided at progressive heights of the conductor winding.

5. The star disk according to claim 3, wherein the multiple additional flutes are provided along at least one quarter of a height of the respective groove flank.

6. The star disk according to claim 5, wherein the multiple additional flutes extend across an identical height on both groove flanks.

7. The star disk according to claim 1, wherein at least the flutes on the web run either perpendicular to the longitudinal axis of the web or at an angle other than 90° to the longitudinal axis of the web, and wherein the flutes are dimensioned such that an exit of a flute is staggered relative to an entrance by a thickness of the conductor wire.

8. The star disk according to claim 1, wherein the web has a rectangular cross section with rounded edges at least on a winding groove side.

9. The star disk according to claim 1, wherein a groove which guides a conductor into the winding groove is formed on the disk body, extending as far as the web and emerging in a plane with the web-side flutes.

10. The star disk according to claim 1, wherein the star disk is made from plastic.

11. A rotor, comprising:
a rotor axis;
a laminated core arranged on the rotor axis; and
two star disks closing the laminated core at ends thereof, on which conductor windings are wound, each of the star disks including:
a central disk body, from which multiple webs extend radially;
a respective end plate provided at an end of each web;
a respective winding groove between the disk body and each end plate;
each winding groove being bounded by the respective web forming a groove bottom and laterally by the disk body and the respective end plate, forming groove flanks;
each winding groove serving to contain a respective conductor winding led around the web and formed from a conductor wire which is wound in multiple layers, wherein the web is provided with flutes running in the winding direction and serving to contain a respective conductor wire segment; and
wherein multiple additional flutes are provided at different heights of the conductor winding on one or both of the groove flanks.

12. The rotor according to claim 11, wherein one star disk has flutes running perpendicular to a longitudinal axis of a first web and the other star disk has flutes running at an angle other than 90° to a longitudinal axis of a second web.

13. A synchronous machine, comprising a rotor including:
a rotor axis;
a laminated core arranged on the rotor axis; and
two star disks closing the laminated core at ends thereof, on which conductor windings are wound, each of the star disks including:
a central disk body, from which multiple webs extend radially;
a respective end plate provided at an end of each web;
a respective winding groove between the disk body and each end plate;
each winding groove being bounded by the respective web forming a groove bottom and laterally by the disk body and the respective end plate, forming groove flanks;
each winding groove serving to contain a respective conductor winding led around the web and formed from a conductor wire which is wound in multiple layers, wherein the web is provided with flutes running in the winding direction and serving to contain a respective conductor wire segment; and
wherein at least one additional flute is provided on one of the groove flanks, and the additional flute is provided at a height of a next layer of the conductor winding.

* * * * *